（12）United States Patent
Howard et al.

(10) Patent No.: US 8,306,938 B1
(45) Date of Patent: Nov. 6, 2012

(54) HYBRID PROBABILISTIC/DETERMINISTIC PLANNING SYSTEM AND METHOD

(75) Inventors: Michael D. Howard, Westlake Village, CA (US); Eric Huang, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 695 days.

(21) Appl. No.: 12/386,371

(22) Filed: Apr. 17, 2009

Related U.S. Application Data

(63) Continuation-in-part of application No. 12/198,437, filed on Aug. 26, 2008.

(60) Provisional application No. 60/968,987, filed on Aug. 30, 2007.

(51) Int. Cl.
*G06F 9/44* (2006.01)
*G06N 7/02* (2006.01)
*G06N 7/06* (2006.01)

(52) U.S. Cl. ......................................................... 706/52
(58) Field of Classification Search ........................ None
See application file for complete search history.

(56) References Cited

U.S. PATENT DOCUMENTS

| | | |
|---|---|---|
| 6,687,606 B1 | 2/2004 | Moitra et al. |
| 2006/0095457 A1 | 5/2006 | Glasspool et al. |

OTHER PUBLICATIONS

Little et al. "Probabilistic planning vs. replanning", ICAPS Workshop on IPC: Past, Present and Future, 2007, total pp. 10.*
Durfee "Distributed Problem Solving and Planning", Lecture Notes in Computer Science, 1999, pp. 1-34.*
Ginsberg et al., "Reasoning About Action I: A Possible Worlds Approach", Artificial Intelligence, 35(2), Jun. 1988, http://citeseerx.ist.psu.edu/viewdoc/summary?doi=10.1.1.45.2121, 29 pgs. plus Title Page.
Ginsberg et al., "Reasoning About Action II: The Qualification Problem", Artificial Intelligence, 1988, 35:311-342, http://citeseerx.ist.psu.edu/viewdoc/summarv?doi=10.1.1.34.360, 30 pgs. plus Title Page.
Zhang et al., "A Coloured Petri Net based Tool for Course of Action Development and Analysis", ACM International Conference Proceeding Series, XP002417643, vol. 145, 2002, pp. 125-134.
Ang et al., "Improving the Practice of DoD Architecting with the Architecture Specification Model", XP002417644, [Online] Jun. 2002, The Mitre Corporation, 10 pages, http://www.mitre.org/work/tech_papers/tech_papers_05/05_0423/05_0423.pdf.
Bondavalli et al., "DEEM: A Tool for the Dependability Modeling and Evaluation of Multiple Phased Systems", Proceedings International Conf. on Dependable Systems and Networks, XP000988657, IEEE Comp. Soc., US, Jun. 25, 2000, pp. 231-236.

(Continued)

*Primary Examiner* — Jeffrey A Gaffin
*Assistant Examiner* — Li-Wu Chang
(74) *Attorney, Agent, or Firm* — Daly, Crowley, Mofford & Durkee, LLP

(57) ABSTRACT

A hybrid probabilistic/deterministic planning system including a hybrid planning engine responsive to a null hybrid contingency plan including user defined probabilistic problem including goals, possible effect actions, and the initial state of one or more possible worlds configured to extract a deterministic planning problem therefrom. A deterministic planning engine responsive to the hybrid planning engine configured to generate one or more deterministic partial plans. The d hybrid planning engine converts the one or more deterministic partial plans into one or more hybrid partial plans and splices the one or more hybrid partial plans into selected null hybrid contingency plans to generate one or more hybrid contingency plans for each agent in each of the one or more possible worlds.

42 Claims, 8 Drawing Sheets

OTHER PUBLICATIONS

Wagenhals et al., "Creating Executable Models of Influence Nets with Colored Petri Nets", XP002417645, Int'l. Journal on Software Tools for Technology Transfer, Springer-Verlag, Germany, Vo. 2, No. 2, Dec. 1998, pp. 168-181.

Mura et al., "Hierarchical Modeling & Evaluation of Phased-Mission Systems", XP00241646, IEEE Transactions on Reliability, 1999, vol. 48, No. 4, pp. 360-368.

Kristensen et al., "Application of Coloured Petri Nets in System Development", XP019007958, vol. 3098, 2004, pp. 626-685.

De et al., "Design and Analysis of Integrated Fires in a Future Mission", Briefing to National Fire Control Symposium, Orlando, Florida, Jul. 25-28, 2005, 21 pages.

Atkin, et al., Planning in Continuous Adversarial Domains, UM-CS-2000-017, 2000, 6 pgs. (unnumbered).

Blum et al., Fast Planning Through Planning Graph Analysis, Artificial Intelligence, 90, 1997, pp. 1-20.

Bui et al., Multi-Agent Planning with Planning Graph, In Proceedings EUNITE 2003, Jul. 10-12, 2003 in Oulu,'Finland, pp. 8.

Willmott et al., Applying Adversarial Planning Techniques to Go. Theoretical Computer Science, Informatics Research Report EDI-INF-RR-0103, 2001, 252(2); pp. 45-82.

Boutilier et al., "Decision Theoretic Planning: Structural Assumptions and Computational Leverage," Journal of AI Research (JAIR), 1999, pp. 1-94.

Bylander, T., "The computational complexity of propositional STRIPS planning", Artificial Intelligence 69, 1994, pp. 1-36 with unnumbered cover page.

Edelkamp et al., "PDDL2.2: The language of the Classical part of the 4$^{th}$ International Planning Competition", Technical Report No. 195, Facbereich Informatik and Institut fur Informatik, Germany, http://andorfer.cs.uni-dortmund.de/~edelkamp/ipc-4/DOCS/pddl2.2.ps.gz, 2004, pp. 1-21.

Madani et al., "On the undecidability of probabilistic planning and related stochastic optimization problems", Artificial Intelligence, 147(1-2), 2003, pp. 5-34.

Blaylock et al., A Dialogue Model for Interaction with Planners, Schedulers and Executives. http://citeseer.ist.psu.edu/547062.html, 2002, pp. 1-9.

Boost Graph Library. Public domain data C++ data structure library. http://www.boost.org/libs/graph/doc/index.html.

Ramshaw, L.A., A three-level model for plan exploration. In Proceedings of the 29$^{th}$ ACL, Berkeley, CA, 1991, pp. 39-46.

Wikipedia. Possible World, http://en.wikipedia.org/wiki/Possible_world, Apr. 2, 2010, 5 pgs.

Wikipedia. Frame Problem, http://en.wikipedia.org/wiki/Frame_problem, Apr. 2, 2010, 1 pg.

Wikipedia. Risk Management, http://en.wikipedia.org/wiki/Risk_Management, May 11, 2010, 14 pgs.

Shen et al., "An Adaptive Markov Game Model for Threat Intent Inference", 2007 IEEE Aerospace Conference, Mar. 3-10, 2007, 13 pgs.

Sentz et al., Combination of Evidence in Dempster-Shafer Theory, Sandia Laboratories Technical Report SAND 2002-0835, Apr. 2002, http://www.sandia.gov/epistemic/Reports/SAND2002-0835.pdf., pp. 3-56.

Artificial Intelligence, A Modern Approach, 2$^{nd}$ Edition, *Chapter 11 Planning*, Prentice-Hall, New Jersey, 2003, pp. 375-416.

Papadimitriou et al., "The Complexity of Markov Decision Processes", Mathematics of Operations Research, vol. 12, No. 3, Aug. 1987, pp. 441-450.

Younes et al., The First Probabilistic Track of the International Planning Competition, Journal of Artificial Intelligence Research, 24 (2005), pp. 851-887.

Hill et al., Implementation of the Anticipatory Planning Support System, Proceedings Advanced Simulation Technologies Conference (ASTC'2001): Military, Government, and Aerospace Simulation Symposium, Seattle, WA, pp. 76-81 (unnumbered).

David Wallace, "Language use in a branching Universe", Balliol College, Oxford OX1 3BJ, U.K., Email: david.wallace@balliol.ox.ac.uk, Dec. 2005, pp. 1-21.

Kuter et al., "Interactive Planning under Uncertainty with Causal Modeling and Analysis". This work was supported in part by Air Force Research Laboratory, Grant F30602-00-2-0505, 8 pgs. (unnumbered).

Amant et al., "Data Analysis Assistance for Interactive Planning", Dept. of Computer Science, North Carolina State University, EGRC-CSC Box 7534, Raleigh, NC 27695-7534,U.S., 2000, stamant@csc.ncsu.edu, healty@csc.ncsu.ed. This research was partially supported by ARPA/Rome Laboratory under Contract F30602-97-1-0289, 8 pgs. (unnumbered).

Donna Aura Lumbo, "Organizational Dynamics Programs", Master of Science in Organizational Dynamics Theses, Applications of Interactive Planning Methodology. University of Pennsylvania, 2007, donnaaura@yahoo.com, Cover pages and Table of Contents, plus pp. 1-63.

Ambite et al., "Getting from Here to There: Interactive Planning and Agent Execution for Optimizing Travel", American Association of Artificial Intelligence (www.aaai.org), 2002, 8 pgs. (unnumbered).

Kuter et al., "Interactive Course-of-Action Planning Using Causal Models", Proceedings of the Third International Conference on Knowledge Systems for Coalition Operations (KSCO-2004), Oct. 2004 (postponed), pp. 1-12.

Gary Borchardt, "Interactive Planning and Monitoring", Artificial Intelligence Laboratory, Massachusetts Institute of Technology, Cambridge, Massachusetts 02139, 2000, http://www.ai.mit.edu, pp. 205-206.

Perini et al., "An Interactive Planning Architecture", The Forest Fire Fighting case, I.R.S.T., 38050 Povo (TN) Italy, 1995, email: perini,ricci@irst.itc.it, 11 pgs. (unnumbered).

Kim et al., "A Planner Independent Approach to Human Interactive Planning", Aug. 9, 2003, University of Southern California and Institute for Creative Technologies, pp. 1-18.

George R.S. Weir, "Learning From A Plan-Based Interface", Compu. Educ., vol. 12, No. 1, p. 247-251, 1988, Pergamon Journals Ltd., pp. 247-251.

Ferguson et al., "TRIPS: An Integrated Intelligent Problem-Solving Assistant", Department of Computer Science, University of Rochester, Rochester, NY 14627-0226, American Association for Artificial Intelligence (www.aaai.org), 1998, 6 pgs. (unnumbered).

Anderson et al., "An Integrated Theory of the Mind", Psychological Review, 2004, vol. 111, No. 4, American Psychological Association, pp. 1036-1040.

Raluca Budiu, ACT-R, website: http://act.r.psy.cmu.edu/about/, 4 pgs.

Horling et al., "The Taems White Paper", Multi-Agent Systems Lab, University of Massachusetts, Amherst, MA 01003, 1999, pp. 1-8.

Written Opinion of the International Searching Authority, dated Nov. 25, 2008, PCT/US07/05741, 4 pgs. (unnumbered).

Written Opinion of the International Searching Authority, dated Feb. 13, 2007, PCT/US2006/040355, 9 pgs. (unnumbered).

Written Opinion of the International Searching Authority, dated Dec. 22, 2008, PCT/US2008/063673, 4 pgs. (unnumbered).

Bradford et al., "The I3S Project: A Mixed, Behavioral and Semantic Approach to Discourse/Dialogue Systems" MCC Technical Report I3S-107-00 Jan. 2000, 8 pgs.

Jensen et al., Optimistic and Strong Cyclic Adversarial Planning, Proceedings of ECP-2001, European Conference on Planning, Toledo, Spain, 14 pgs.

* cited by examiner

HYBRID PROBABILISTIC/DETERMINISTIC PLANNING SYSTEM AND METHOD

RELATED APPLICATIONS

This application is a continuation-in-part of U.S. patent application Ser. No. 12/198,437, filed Aug. 26, 2008, which claims benefit of and priority to U.S. Provisional Application Ser. No. 60/968,987, filed Aug. 30, 2007, under 35 U.S.C. §§119, 120, 363, 365, and 37 C.F.R. §1.55 and §1.78, all of which are incorporated by reference herein.

FIELD OF THE INVENTION

The subject invention relates to a hybrid probabilistic/deterministic planning system and method.

BACKGROUND OF THE INVENTION

Conventional deterministic planning systems rely on a known state of the world where actions taken have a deterministic effect. One known adversarial reasoning deterministic planning system, known as Rapid Adversarial Planning with Strategic Opponent-Driven Intelligence (RAPSODI), by one or more of the inventors hereof and the inventive entity hereof, relies on analysis of deterministic adversarial problems wherein the state of the world is known and actions have deterministic effects. See e.g., U.S. patent application Ser. No. 12/198,437, entitled "Methods and Apparatus For Adversarial Planning", filed on Aug. 26, 2008, cited supra. Uncertainty is handed off to a user, e.g., as a commander of a branch of the armed forces, such as the Army, Navy, Air Force, Marines, and the like, who selectively explores different possibilities during the planning. Such an approach achieves a very fast response for a moderately complex adversarial problem and presents the user with a "what if" sort of mission planning tool.

However, the conventional deterministic systems discussed above provide inadequate expressiveness and do not account for probabilistic actions, multiple possible worlds, and probabilistic contingencies. The term "possible world" is used in the sense of modal logic, and specifically herein refers to a description of a state of the world and a set of possible actions that entities can take in that world.

Conventional probabilistic planning systems typically include probabilistic actions and can account for one or more possible worlds. However, such systems require maintenance of a belief state for the one or more possible worlds. Planning typically generates plans that are based on the maintained belief state. However, such a design results in impractical complexities that are not tractable and thus cannot realistically be computed by currently available computer systems. The result is that conventional probabilistic planning systems cannot provide useful plans to the user.

Thus, there is a need for a hybrid probabilistic/deterministic planning system and method which is less complex, more tractable, capable of achieving a fast response, and which accommodates probabilistic actions, multiple possible worlds, and probabilistic contingencies.

BRIEF SUMMARY OF THE INVENTION

The subject invention, however, in other embodiments, need not achieve all these objectives and the claims hereof should not be limited to structures or methods capable of achieving these objectives.

This invention features a hybrid probabilistic/deterministic planning system including a hybrid planning engine responsive to a null hybrid contingency plan including user defined probabilistic problem including goals, possible effect actions, and the initial state of one or more possible worlds configured to extract a deterministic planning problem therefrom. A deterministic planning engine is responsive to the hybrid planning engine and is configured to generate one or more deterministic partial plans. The hybrid planning engine may convert the one or more deterministic partial plans into one or more hybrid partial plans and splices the one or more hybrid partial plans into selected null hybrid contingency plans to generate one or more hybrid contingency plans for each agent in each of the one or more possible worlds.

In one embodiment, the hybrid planning engine may splice the one or more hybrid partial plans into selected hybrid contingency plans for each agent in each of the one or more possible worlds to generate a plurality of hybrid contingency plans. The hybrid planning engine may compare selected hybrid contingency plans from the plurality of hybrid contingency plans to determine one or more conflicts therein. The selected hybrid contingency plans may include at least a hybrid contingency plan for one or more uncontrolled agents in the one or more possible worlds and a hybrid contingency plan for one or more controlled agents in the one or more possible worlds. The hybrid planning engine may generate a deterministic planning problem for each of the one or more conflicts. The deterministic problem may include possible effect actions having multiple effects which are converted into one or more deterministic actions each having a single effect. The hybrid planning engine may evaluate deterministic actions converted from possible effect actions and incorporates only those deterministic actions into each the deterministic planning problem that satisfy a predetermined constraint. The deterministic planning engine may generate one or more deterministic partial plans from each deterministic problem. The hybrid planning engine may convert the one or more deterministic partial plans into a hybrid partial plan. The hybrid planning engine may splice that hybrid partial plan into one of the selected hybrid contingency plans to resolve the one or more conflicts. The hybrid contingency plan may include possible effect actions and/or deterministic actions. The selected hybrid contingency plans may be selected by a user or by the hybrid planning engine. The hybrid planning engine may be configured to perform simultaneous reachability analysis across the one or more possible worlds in a single pass to ground the possible effects actions into grounded deterministic actions. The system may further include a processor and a memory.

This invention also features a hybrid probabilistic/deterministic planning system including a hybrid planning engine configured to compare selected hybrid contingency plans to determine one or more conflicts therein and extract one or more deterministic planning problems therefrom to resolve the one or more conflicts. A deterministic planning engine is responsive to the hybrid planning engine configured to generate one or more deterministic partial plans. The hybrid planning engine may convert the one or more deterministic partial plans into a hybrid partial plan and then splices that hybrid partial plan into one of the selected hybrid contingency plans to resolve the one or more conflicts.

In one embodiment, the selected hybrid contingency plans may include at least a hybrid contingency plan for one or more uncontrolled agents in one or more possible worlds and a hybrid contingency plan for one or more controlled agents in one or more possible worlds. The hybrid planning engine may generate a deterministic planning problem for each of the one or more conflicts. The deterministic problem may include the possible effect actions having multiple effects which are converted into one or more deterministic actions each having a single effect. The hybrid planning engine may evaluate the deterministic actions converted from the possible effect actions and incorporates only those deterministic actions into each the deterministic planning problem that satisfy a predetermined constraint. The deterministic planning engine may generate one or more deterministic partial plans from each the deterministic problem. The hybrid planning engine may convert the one or more deterministic partial plans into the hybrid partial plan. The hybrid planning engine may splice that hybrid partial plan into one of the selected hybrid contingency plans to resolve the one or more conflicts. The hybrid contingency plan may include possible effect actions and/or deterministic actions. The selected hybrid contingency plans may be selected by a user or by the hybrid planning engine. The hybrid planning engine may be configured to perform simultaneous reachability analysis across the one or more possible worlds in a single pass to ground the possible effects actions into grounded deterministic actions. The system may further include a processor and a memory.

This invention further features a hybrid probabilistic/deterministic planning method including generating one or more null hybrid contingency plans including a user defined probabilistic problem including goals, possible effect actions, and the initial state of one or more possible worlds, extracting one or more deterministic planning problems from the one or more null hybrid contingency plans, generating one or more deterministic partial plans from the one or more deterministic planning problems, converting the one or more deterministic partial plans into one or more hybrid partial plans, and splicing the one or more hybrid partial plans into selected null hybrid contingency plans to generate one or more hybrid contingency plans for each agent in each of the one or more possible worlds.

In one embodiment, the method may include the step of splicing the one or more hybrid partial plans into selected hybrid contingency plans for each agent in each of the one or more possible worlds to generate a plurality of hybrid contingency plans. The method may include the step of comparing selected hybrid contingency plans from the plurality of hybrid contingency plans to determine one or more conflicts therein. The selected hybrid contingency plans may include at least a hybrid contingency plan for one or more uncontrolled agents in the one or more possible worlds and a hybrid contingency plan for one or more controlled agents in the one or more possible worlds. The method may include the step of generating a deterministic planning problem for each of the one or more conflicts. Each deterministic problem may include possible effect actions having multiple effects which are converted into one or more deterministic actions each having a single effect. The method may include the step of evaluating the deterministic actions converted from possible effect actions and incorporates only those deterministic actions into each said deterministic planning problem that satisfy a predetermined constraint. The method may include the step of generating one or more deterministic partial plans from each said deterministic problem. The method may include the step of converting said one or more deterministic partial plans into the hybrid partial plan. The method may include the step of splicing that hybrid partial plan into one of the selected hybrid contingency plans to resolve the one or more conflicts. The selected hybrid contingency plans may be selected by a user and/or a hybrid planning engine. The method may include the step of performing simultaneous reachability analysis across the one or more possible worlds in a single pass to ground the possible effects actions into grounded deterministic actions.

This invention further features a hybrid probabilistic/deterministic planning method including selecting at least two hybrid contingency plans, comparing the selected hybrid contingency plans to determine one or more conflicts therein, extracting a deterministic planning problem from the selected hybrid contingency plans to resolve the one or more conflicts, generating one or more deterministic partial plans from the deterministic planning problem, converting the one or more deterministic partial plans into a hybrid partial plan, and splicing the hybrid partial plan into one of the hybrid contingency plans to resolve the one or more conflicts.

In one embodiment, the selected hybrid contingency plans may include at least a hybrid contingency plan for one or more uncontrolled agents in one or more possible worlds and a hybrid contingency plan for one or more controlled agents in one or more possible worlds. The method may include the step of generating a deterministic planning problem for each of the one or more conflicts. A deterministic problem may include the possible effect actions having multiple effects which are converted into one or more deterministic actions each having a single effect. The method may include the step of evaluating the deterministic actions converted from possible effect actions and incorporates only those deterministic actions into each said deterministic planning problem that satisfy a predetermined constraint. The method may include the step of generating one or more deterministic partial plans for each said deterministic problem. The method may include the step of converting said one or more deterministic partial plans into the hybrid partial plan. The method may further include the step of splicing that hybrid partial plan into one of the selected hybrid contingency plans to resolve said one or more conflicts. The selected hybrid contingency plans may be selected by a user and/or a hybrid planning engine. The method may include the step of performing simultaneous reachability analysis across the one or more possible worlds in a single pass to ground the possible effects actions into grounded deterministic actions.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
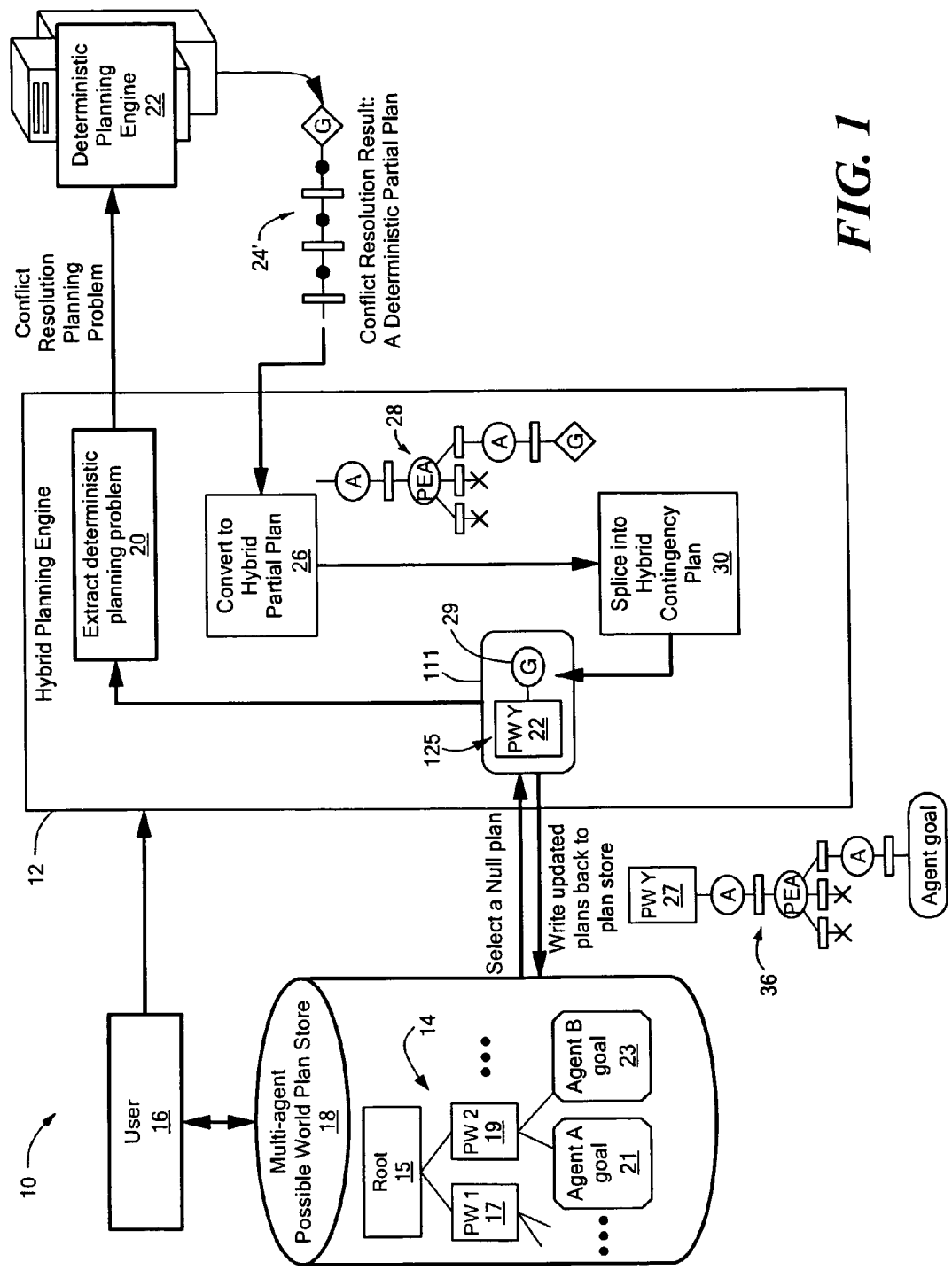
FIG. 1 is a schematic block diagram showing the primary components of one embodiment of the probabilistic/deterministic planning system of this invention used to generate a hybrid contingency plan for each agent in each possible world.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of hybrid probabilistic/deterministic planning system 10 of this invention. As defined herein, hybrid means a combination of probabilistic and deterministic. System 10 includes hybrid planning engine 12 responsive to a null hybrid contingency plan which includes user a defined probabilistic problem including goals, possible effect actions (PEAs), and the initial state of one or more possible worlds, e.g. null hybrid contingency plan 14. Null hybrid contingency plan 14 is defined by user 16, typically via a text file, and preferably includes, inter alia, a root with multiple possible worlds, and goals and PEAs for each agent in each of the possible worlds. In this example, null hybrid contingency plan 14 includes root 15, the initial state for PW1, indicated at 17, and the initial state of PW2 indicated at 19. For example, PW2 includes goals and PEAs for Agent A-21 (e.g., uncontrolled agents) and goals and PEAs for Agent-B-23 (e.g., controlled agents). Null hybrid contingency plan 14 is preferably stored in plan store database 18. The probabilistic problem defined by user 16 in null hybrid contingency 14 typically includes known facts related to known possible worlds, known agents, and what goal each agent is trying to achieve.

Hybrid planning engine 12 extracts a deterministic planning problem from a selected null hybrid contingency plan, indicated at 20. In this example, user 16 has selected null hybrid contingency plan 25 for one of the agents in possible world PW-Y 27 having goals 29. Typically, the selected null hybrid contingency plan is stored in memory location 111 while it is being planned. The selected null hybrid contingency plan could be any agent plan for any two agent plans that may be in the same or different possible worlds. Hybrid planning engine 12, instead of user 16, may also select a null hybrid contingency plan for which a deterministic planning problem is to be extracted to automate the process. In either case, once a null hybrid contingency plan has been selected, hybrid planning engine 12 creates a deterministic plan for each agent individually and determines how the agent would solve the goals in the absence of any other agents.

System 10 also includes deterministic planning engine 22 which receives the deterministic planning problem and generates a deterministic partial plan therefrom, e.g., deterministic partial plan 24. Hybrid planning engine 12 then converts the deterministic planning problem a hybrid partial plan, indicated at 26, e.g., hybrid partial plan 28. Hybrid planning engine 12 then splices the hybrid partial plan into the selected null hybrid contingency plan, indicated at 30, to generate a hybrid contingency plan. In this example, hybrid partial plan 28 is spliced into selected null hybrid contingency plan 27 between PWY-27 and goal 27 to generate hybrid contingency plan 36. The updated hybrid contingency plan 36 is then typically stored in plan store database 18. System 10 repeats the above process to generate a hybrid contingency plan for each agent in each of the possible worlds of interest to user 16, as discussed in further detail below. System 10 is typically software executed on a processor as known by those skilled in the art.

Figure 2:
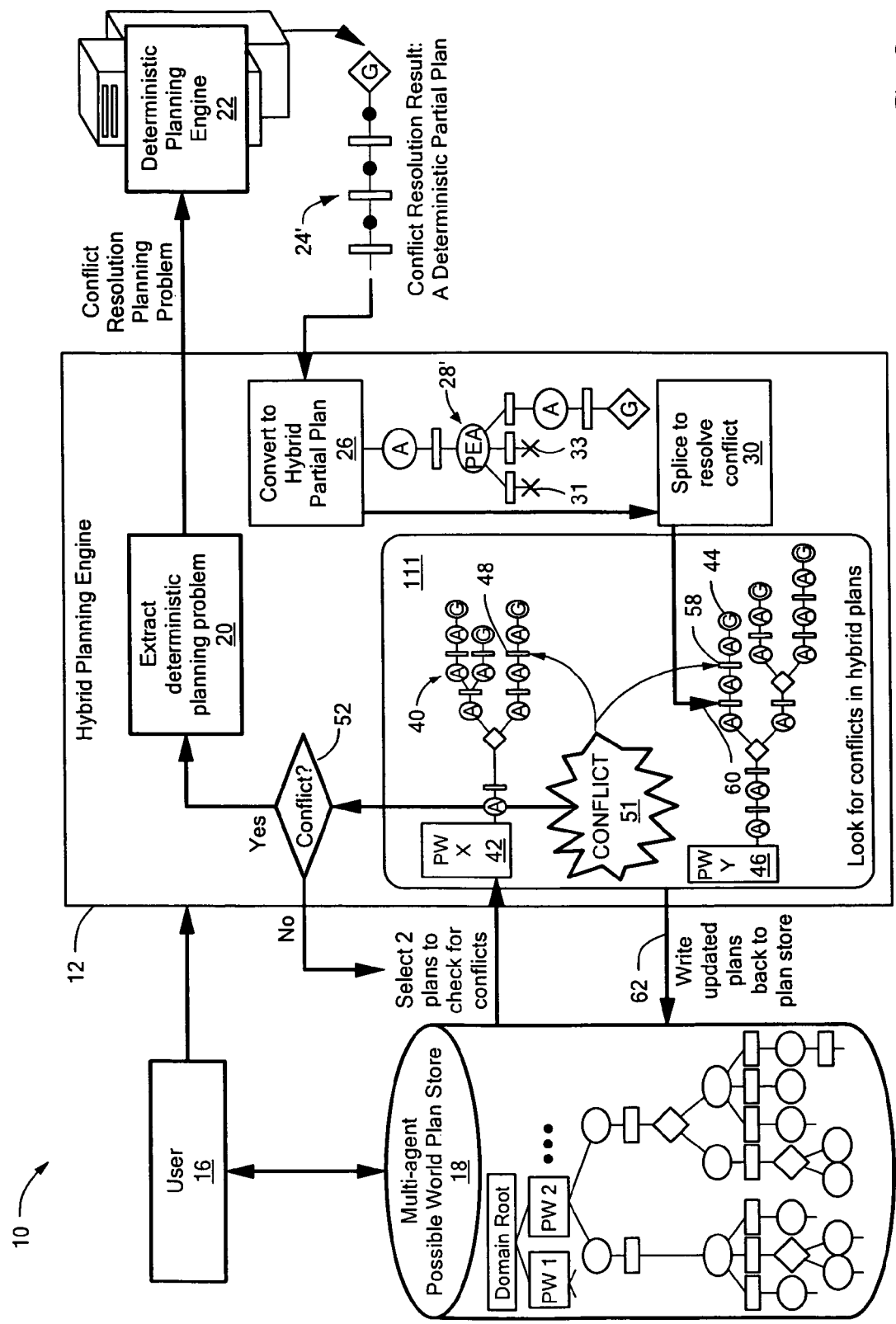
FIG. 2 is a schematic block diagram showing the system shown in FIG. 1 used to resolve conflicts between selected hybrid contingency plans.

Once a hybrid contingency plan for each agent in each possible world has been generated, hybrid planning engine 12, FIG. 2, compares two selected hybrid contingency plans for different agents in the same or different possible worlds. Typically, one hybrid contingency plan is selected for one or more uncontrolled agents (red agents), e.g., hybrid contingency plan 40, and another hybrid contingency plan is selected for one more controlled agents (blue agents), e.g., hybrid contingency plan 44. Hybrid planning engine 12 then determine conflicts between the two selected hybrid contingency plans. For example, user 16 may select hybrid contingency plan 40 for possible world PWX-42 and uncontrolled agents (red agents) and hybrid contingency plan 44 for PWY-46 for controlled agents (blue agents). Hybrid planning engine 12 then compares the selected hybrid contingency plans 40 and 44 to determine conflicts therein, e.g., the conflict between effect 48 in hybrid contingency plan 40 and effect 50 in hybrid contingency plan 44. When a conflict is found, indicated at 51 and decision block 52, hybrid planning engine 12 extracts a deterministic planning problem, indicated at 20, to resolve the conflict.

To generate the deterministic planning problem, hybrid planning engine 12 preferably converts possible effects actions (PEAs) in the hybrid contingency plans which have multiple possible effects into one or more deterministic actions, each having a single effect. Ideally, hybrid planning engine 12 evaluates the PEAs and incorporates only those PEAs actions into the deterministic problem that satisfy a predetermined constraint.

Deterministic planning engine 22 receives the deterministic planning problem and generates a deterministic partial plan from the deterministic planning problem, e.g., deterministic partial plan 24', similar as discussed above. Hybrid planning engine 12 receives the deterministic partial plan and converts it to a hybrid partial plan, e.g., hybrid partial plan 28' is converted from deterministic partial plan 24'. Hybrid planning engine 12 then splices the hybrid partial plan into one of the selected hybrid contingency plans to resolve the conflict. In this example, hybrid partial plan 28' converted from deterministic partial plan 24' is for controlled agents and is spliced into hybrid contingency plan 44 for controlled agents before effect 50, as shown by arrow 60, to resolve the conflict.

An example of a conflict would be if the plan for PWY-46 includes an action to cross a bridge and the plan for PWX-42 includes an action to blow up that bridge at an earlier time. The conflict is discovered by observing that the preconditions for the "cross bridge" action in PWY-46 includes the bridge is intact and the "bridge intact" fluent was made false by plan PWX-42. Such conflict discovery analysis is disclosed in further U.S. patent application Ser. No. 12/198,437, cited supra. The updated hybrid contingency plan is then written back to the plan store database 18, indicated at 62. The above process may be repeated for any number of selected hybrid contingency plans, selected either by user 16 or automatically by hybrid planning engine 17.

In summary, each PEA has a number of possible effects. A common practice known to those skilled in the art of deterministic planning for increasing planning speed is grounding. Hybrid planning engine 12 performs a grounding process for PEAs, in which, a single PEA gets converted into multiple deterministic actions, one for each possible effect by hybrid planning engine 12, before the standard grounding process begins. Hybrid planning engine 12 then requests a deterministic partial plan from deterministic planning engine 24. When the deterministic partial plan is returned, hybrid planning engine 12 inspects the actions in the deterministic partial plan and looks for any actions that were created from a PEA. For each that it finds, hybrid planning engine 12 turns the deterministic action back into a PEA, annotating it with the likelihood of the effect that deterministic planning engine 22 chose, as well as the likelihoods of any effects that were not chosen. Those effects that were not chosen are "stubs" at this point; i.e., they do not lead to any plan branch, e.g., stubs 31 and 33 on hybrid partial plan 28'. Hybrid planning engine 12 can then plan out any of those stubs, depending on user-defined constraints that tell it how many effects of a PEA to automatically plan out, or depending on a threshold of likelihood for an effect that should be planned. For each of the other effects that should be planned automatically, hybrid planning engine 12 composes another planning request for deterministic planning engine 22 and when each of those deterministic partial plans are returned, hybrid planning engine 12 splices them into the appropriate stubbed-out effect of the PEA in the hybrid contingency plan. An example of a PEA is an "open-door" action, with two possible effects: either the door opens, or it does not (the door may be stuck, or locked). The likelihood of the door open effect might be 95% in some scenarios, and the other effect 5% (in other scenarios there could be a more equal likelihood). Hybrid planning engine 12 converts the open-door PEA into two deterministic actions: one is an open-door action with the effect of the door being opened and the other is an open-door action with the effect of the door staying closed. Depending on the scenario, hybrid planning engine 12 incorporates one of the actions (e.g., the 95% door open effect) into the deterministic planning problem as indicated at 20. When deterministic partial plan 24' is returned, if the open-door action appears, it is restored as a PEA with only the 95% effect planned. Subsequently, the 5% possible effect that the door did not open may be planned out by extracting that as the starting place for another deterministic planning problem, this time including only the open-door deterministic action where the door remains closed.

Figure 3:
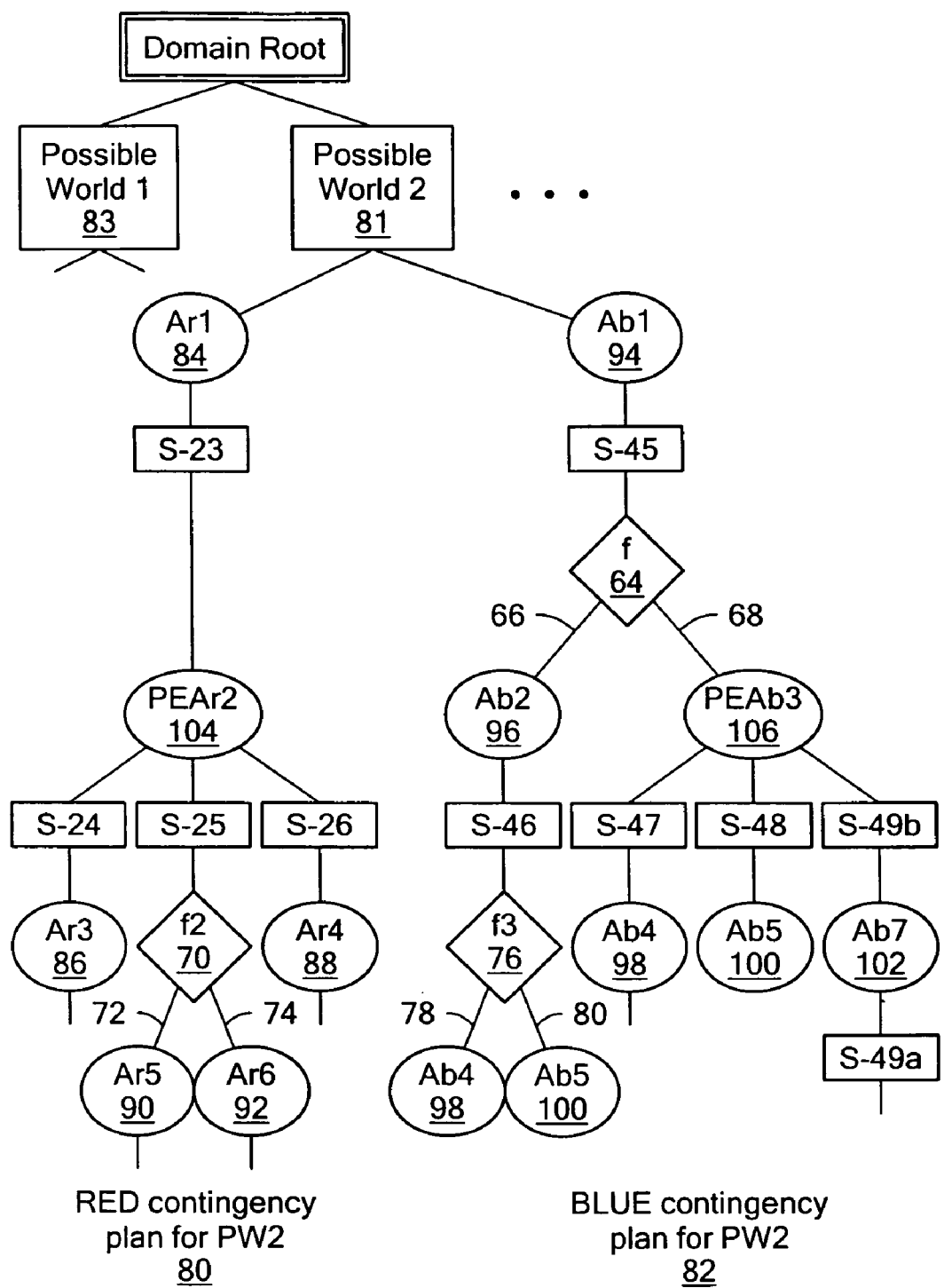
FIG. 3 is a schematic block diagram showing an example of hybrid contingency plan generated by the system shown in FIG. 2.
Figure 4:
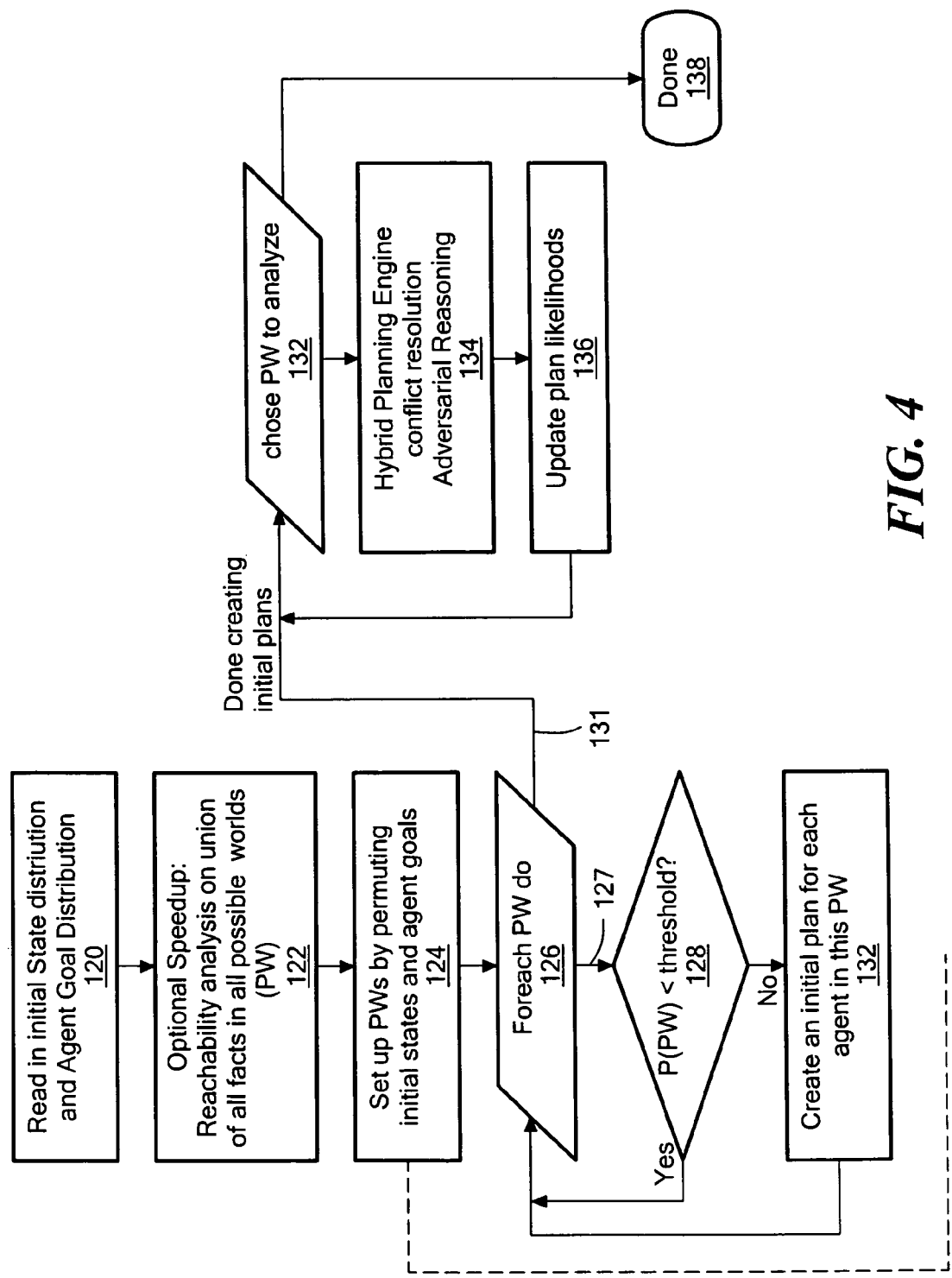
FIG. 4 is a flow chart showing one embodiment of the planning of possible worlds in accordance with this invention.

When hybrid planning engine 12 splices the hybrid partial plan into the hybrid contingency plan to resolve a conflicts, it creates a decision node with at least two branches, e.g., decision node 64, FIG. 3, with branches 66 and 68, decision node 70 with branches 72 and 74, and decision node 76 with branches 78 and 80. Preferably, one branch off the decision node includes the likelihood the conflict will occur and the other branch includes the likelihood the conflicts will not occur based on computed likelihoods of facts that represent the value of certain beliefs, discussed in further detail below.

FIG. 3 shows an example of hybrid contingency plan 80 generated by system 10 of this invention for uncontrolled agents (red agents) and hybrid contingency plan 82 for controlled agents (blue agents) both in possible world 2, indicated at 81. Similar type hybrid contingency plans are generated for each agent in each of the desired possible worlds, e.g., possible worlds 1, indicated at 83, as well as any other possible worlds desired by the user. Hybrid contingency plans 80 and 82 preferably include possible effect actions and deterministic actions. For example, hybrid contingency plan 80 includes deterministic action nodes, e.g., Ar1-84 (an action for uncontrolled agents or red agents), Ar3-86, Ar4-88, Ar5-90, and Ar6-92. In this example, hybrid contingency plan 82 includes deterministic action nodes Ab1-94 (an action for one more controlled agents or blue agents), Ab2-96, Ab4-98, Ab5-100, and Ab7-102. S-23 is the state of possible world 2 as a result of deterministic action Ar1-84, S-45 is the state of the possible world 2 as a result of deterministic actions Ab1-94, S-46 is the state of the possible world 2 as a result of deterministic actions Ab1-96, and S49a is the state of the possible world 2 as a result of deterministic actions Ab7-102. Examples of possible effect nodes may include possible effect action node PEAr2-104 which results in states S-24, S-25, and S-26 and possible effect action node PEAb3-106 which results in states S-47, S-48 and S-49b.

A possible effect action will have a number of effects. For example, possible effect action PEAb3-106, FIG. 3, has three possible effects S-47, S-48, and S-49b. Hybrid planning engine 12, FIG. 2, converts the possible effects S-47, S-48, and S-49b into three deterministic actions (not shown) as described above and passes one or more of the deterministic actions to deterministic planning engine 24. Deterministic planning engine 24 considers incorporating them into a partial plan using standard selection criteria as known by those skilled in the art; e.g., such as minimizing cost or time to accomplish goals. Deterministic planning engine 22 inserts the chosen deterministic action into a deterministic partial plan, e.g., deterministic partial plan 24. Then, hybrid planning engine 12, after receiving the deterministic partial plan, converts the deterministic partial plan to a hybrid partial plan, as discussed above, recognizing any deterministic actions that were derived from possible effect actions and reconstituting them as PEAs with one of the effects leading to the rest of the plan, while leaving the other PEA effects not chosen by the deterministic planning engine 24 as stubs.

In a preferred design, hybrid planning engine 12 is configured to perform simultaneous reachability analysis across the one or more possible worlds in a single pass to ground all actions into grounded deterministic actions, after converting each PEA into a set of deterministic actions.

The result is system 10 has converted a probabilistic problem into deterministic sub-problems, created deterministic partial plans, converted the deterministic partial plans back into a probabilistic hybrid partial plans and then spliced those hybrid partial plans into hybrid contingency plans to resolve conflicts. Thus, hybrid system 10 is less complex and more tractable than conventional probabilistic planning systems and can achieve a response nearly as fast as conventional deterministic planning systems while accommodating probabilistic actions, multiple possible worlds, and probabilistic contingencies.

One exemplary operation of hybrid probabilistic/deterministic planning system 10 is now discussed with reference to FIGS. 1-4. Hybrid planning engine 12, FIGS. 1-2, reads in the initial state distribution and agent goal distribution, step 120, FIG. 4. An optional reachability analysis on the union of all facts and all possible worlds may be performed, step 122. System 10 initializes a possible world for each permutation of initial state facts with a set of agent goal facts, step 124. At block 126 and 128, system 10 iterates through each resulting possible world to test whether the probability of that PW is less than a threshold. The likelihood of each possible world is given a likelihood of each initial state times the likelihood of each set of agent goals. Thus, system 10 is capable of considering only the most likely of these possible worlds. If the likelihood is less than threshold at decision block 128, system 10 creates initial plans for each agent in that world at block 130. Otherwise system 10 does not create an initial plan. Once all the possible worlds are created, shown at 131, user 16, FIG. 2, chooses a possible world to analyze, step 132, FIG. 4. Alternatively, step 132 can be automated by system 10. Hybrid planning engine 12, FIG. 2, resolves conflicts, as discussed above, step 134, FIG. 4. Hybrid planning engine 12 then updates the likelihood of the plans, step 136. The loop of blocks 132, 134, 136 may be repeated until some predetermined time or until the user is satisfied. Once completed, the analysis is done, step 138. Possible initial states are sets of facts that are true in each possible world. Agent goals for each agent in each possible world are a set of facts that the agent intends to make true.

Figure 5:
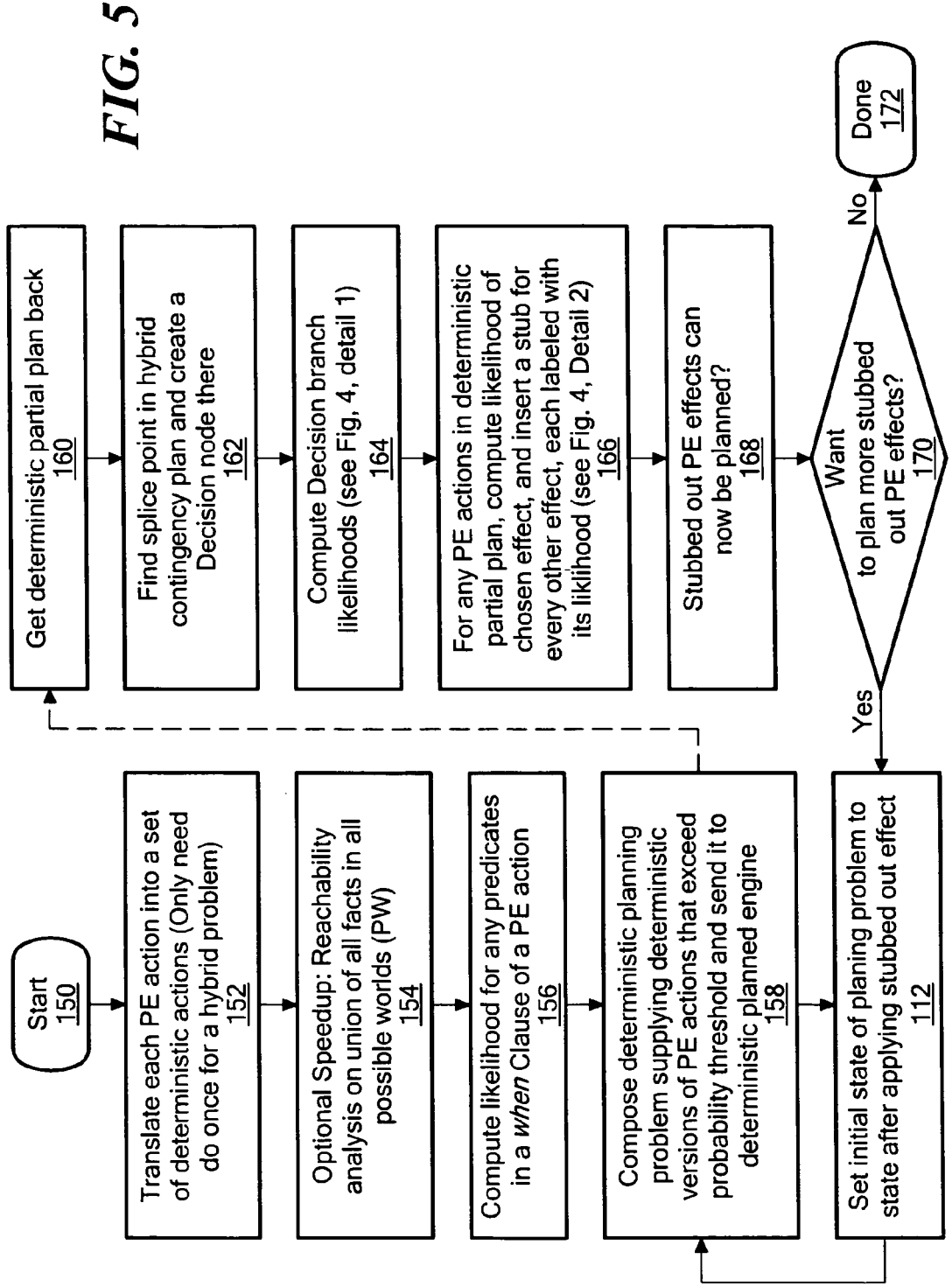
FIG. 5 is a flow chart showing one example of the steps associated with extracting deterministic problems from a probabilistic problem in accordance with this invention.
Figure 6A:
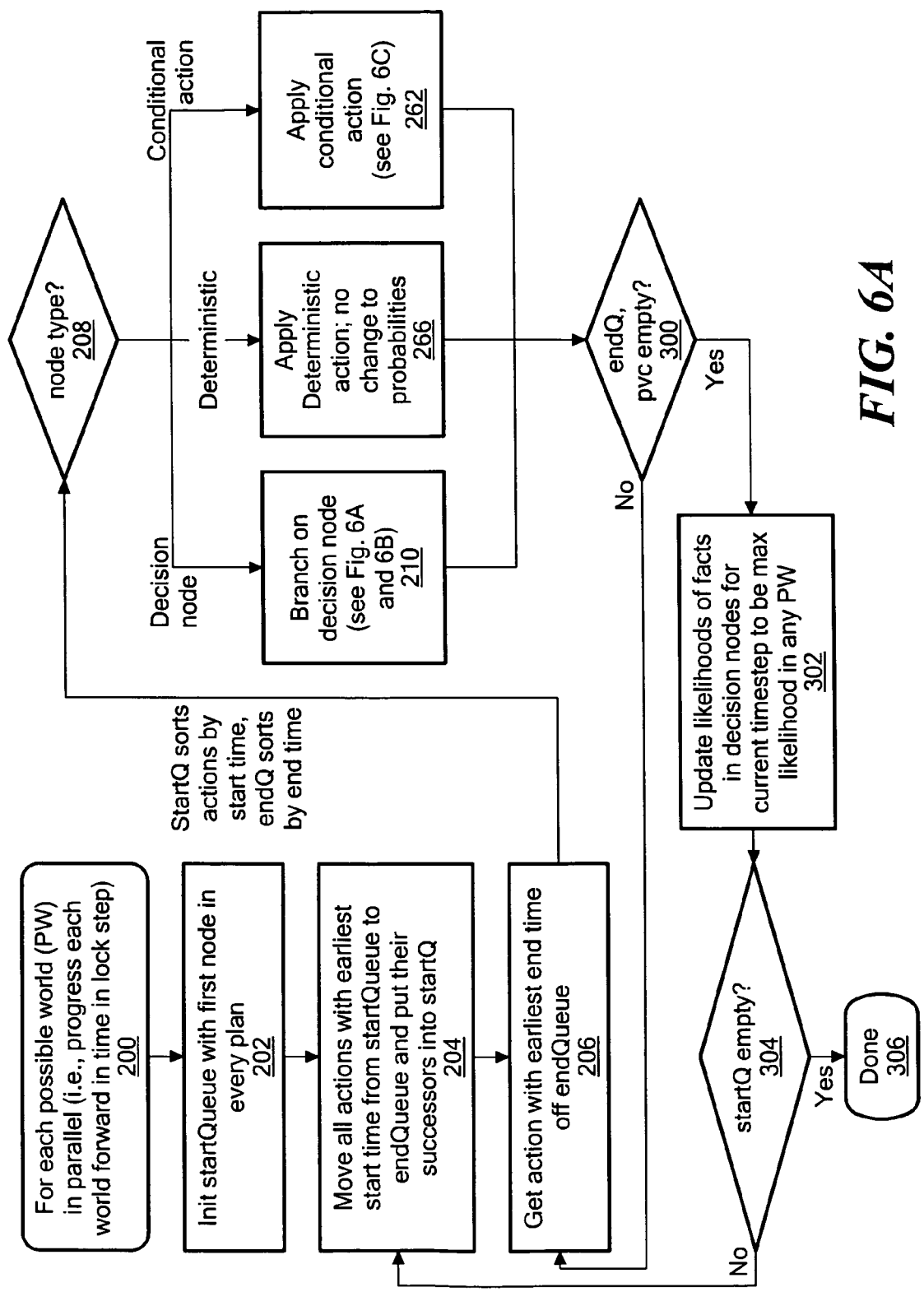
FIG. 6A is a flow chart showing the primary steps associated with updating the likelihood of facts in the decision nodes shown in FIG. 5.
Figure 6B:
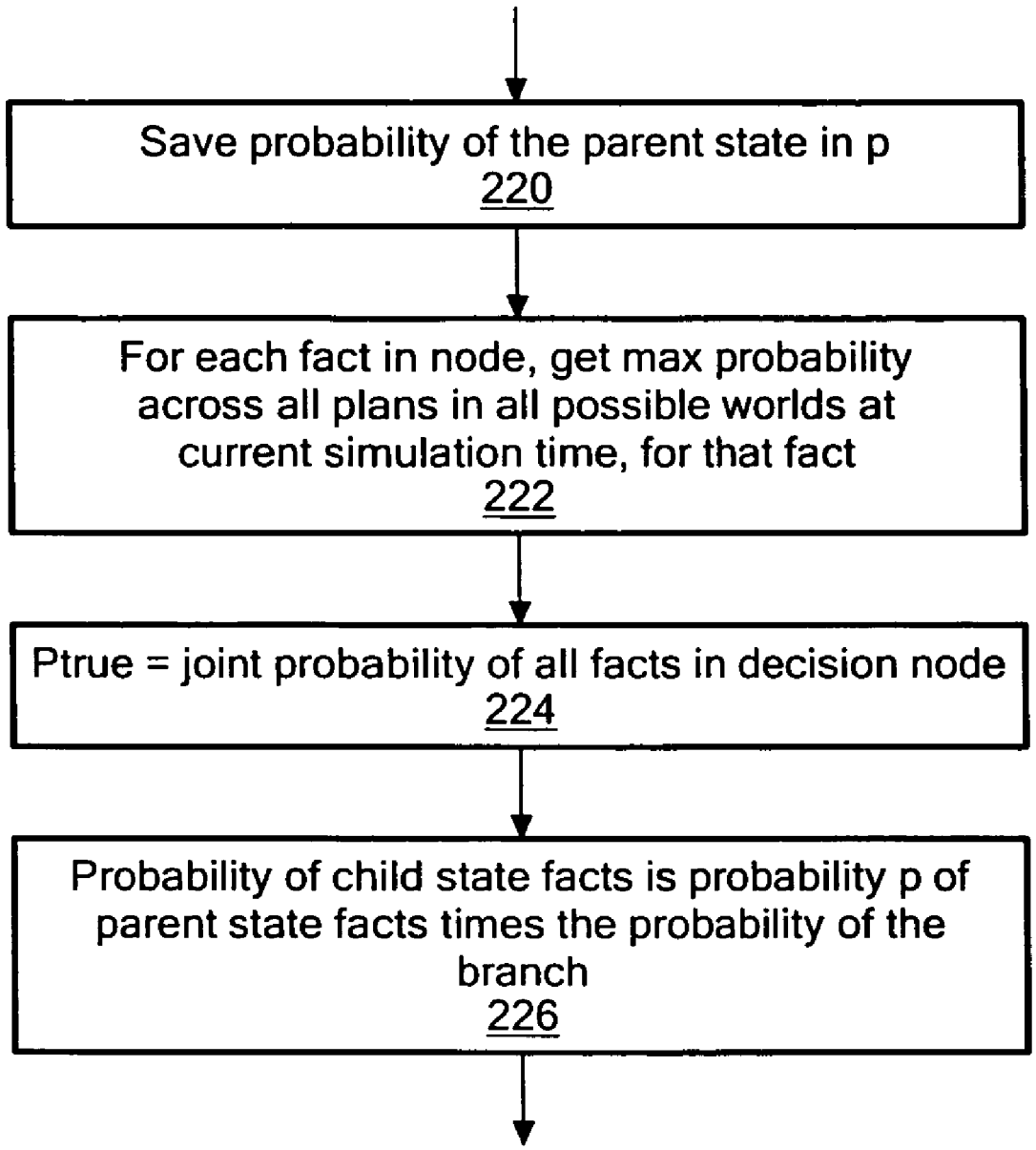
FIG. 6B is a continuation of FIG. 6A showing in further detail the steps associated with creating a branch on a decision node.
Figure 6C:
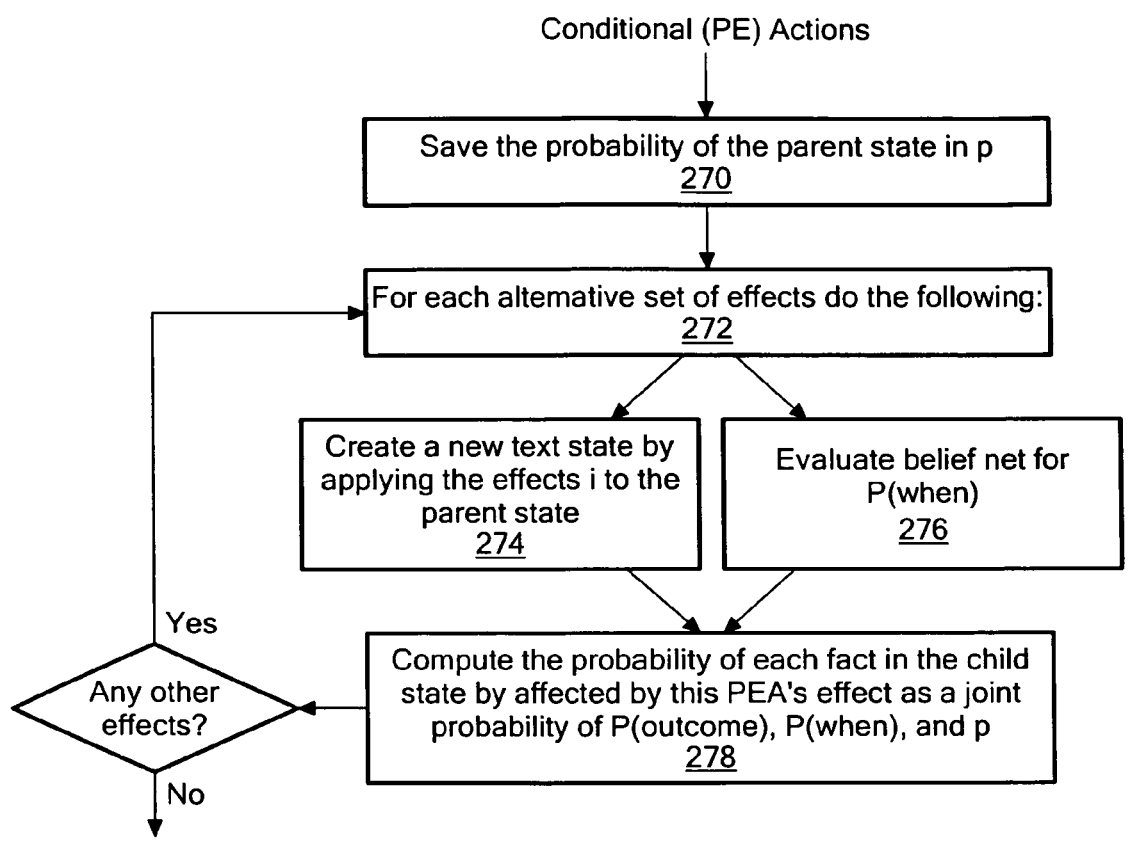
FIG. 6C is a schematic block diagram showing the steps associated with applying a conditional action shown in FIG. 6A.

FIG. 5 shows a flow diagram showing one example of the process of extracting a deterministic problem from a hybrid probabilistic plan using hybrid planning engine 12, FIGS. 1-2, in accordance with this invention. System 10 is initiated or started, step 150, FIG. 4. Hybrid planning engine 12 then translates each PEA in the probabilistic problem into a set of deterministic actions, step 152. This need only be done once for each hybrid problem. An optional speed-up reachability analysis of the union of all facts and all possible worlds is then performed, step 154. The likelihood any of predicates in a "when" clause of a possible effect action is then computed, step 156. Hybrid planning engine 12 then composes a deterministic planning problem by supplying a deterministic version of possible effect actions that exceed a probability threshold and send it to deterministic planning engine 22, step 158. Hybrid planning engine 12 receives the deterministic partial plan, step 160. Hybrid planning engine 12 then locates a splice point in the hybrid contingency plan, and creates a decision node, e.g., as discussed above with reference to FIGS. 2 and 3. Hybrid planning engine 12 then computes a decision branch of likelihoods, step 164. Then, for each possible effect action in the deterministic partial plans, hybrid planning engine 12 computes the likelihood of a chosen effect and inserts a stub for every other effect, each labeled with likelihood, step 166. The stubbed out possible effects can then be planned, step 168. At decision block 170, a decision is made whether to plan more stubbed out possible effects. If "yes", hybrid planning engine 12 then sets the initial state of the planning problem to state after applying the stubbed out effects, step 172. This returns to step 158. A "no" at decision block 170 completes the process, indicated at 172.

The likelihood of an update on each branch of the various nodes of the hybrid contingency plan is now discussed with reference to FIGS. 2-3 and 6A-6C. For each possible world in parallel, hybrid planning engine 12 progresses each possible world forward in time in a lock-step, step 200, FIG. 6A. An Init startQueue of first node in every plan is then performed, step 202. StartQueue sorts actions by start time and endQueue sorts by end time. All actions are then moved with the earliest start time from startQueue to endQueue and their successes are put into the startQueue, step 204. An action is then retrieved with the earliest end time of the endQueue, step 206. At decision block 208, a determination of the node type is then made. If it is a decision node, e.g., any of decision nodes 64, 70, or 72, FIG. 3, hybrid planning engine 12 determines the branch on the decision node, step 210, FIG. 6A. A decision node has a condition, which is a set of facts. If all the facts are true, the "ptrue" is traversed. If any are false, then "pfalse" branch is traversed. Hybrid planning engine 12 computes the likelihoods that each branch will be taken which means the likelihood of all facts being true. In the simulation for each possible world being performed by hybrid planning engine 12, hybrid planning engine 12 analyzes the likelihood each factor will be true and the simulation is moved for each possible world forward in time in lock-step. Therefore, all that needs to be done is to encounter a "when" in a decision node and look up the maximum probability for each factor across the current state of the possible world. The safe probability of the parent state is then saved as "p", step 220, FIG. 6B. For each fact in the decision node, the maximum probability across all plans in all possible worlds at the current simulation time is performed for that fact, step 222. When "ptrue" is true, it equals the joint probability of all facts in the decision node. The probability of the child state facts is computed as the probability of "p" of parent state facts times the probability of the branch, step 226. If the node type is a deterministic node type, e.g., the deterministic nodes discussed above with reference to FIG. 3, then a deterministic action is applied and no change is made to the probabilities, step 260, FIG. 6A. If the node type is a conditional action node type, then a conditional action is applied, step 262. In this case, the probability of the parent state is saved in "p", step 270, FIG. 6C. At block 272, for each alternative set of effects, a determination is made to either create a new next state by applying the effects to the parent state, step 274, or evaluate the belief net for P(when), step 276. This leads to step 278 where hybrid planning engine 12 computes the probability of each fact in the child state affected by the PEAs as a joint probability of the particular outcome as given in the PEA definition P(outcome), the probability of "when" clause above P(when) and the probability "p" of the parent state above, step 278. A propagate function could be dominant dependent, such as a standard Bayesian joint probability with equal weighting for the outcome, P(when) and p.

Returning now to FIG. 6A, at decision block 300, a determination is made whether the endQueue is empty. If "no", this leads back to step 206. If "yes", hybrid planning engine 12 updates the likelihood of facts in the decision nodes for the current time step to be the maximum likelihood in any possible world, step 302. This leads to decision block 304 where a determination is made whether the startQueue is empty. If "no", this leads back to step 204. If "yes", the process is completed, step 306.

Thus, one of the goals of system 10 is to update the likelihoods of every branch in the hybrid contingency plan in a particular possible world. For decision nodes, this is the joint likelihood of all facts in the decision expression which are turned into a function of the likelihood of any agents in any possible world that affects the Boolean value of each of those facts. Hybrid planning engine 12 computes this likelihood for each possible worlds and takes the maximum in any possible world.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A hybrid probabilistic/deterministic planning system comprising:
    a computer processor;
    a hybrid planning engine to run on the computer processor responsive to a null hybrid contingency plan including user defined probabilistic problem including goals, possible effect actions, and the initial state of one or more possible worlds configured to extract a deterministic planning problem therefrom; and
    a deterministic planning engine responsive to the hybrid planning engine configured to generate one or more deterministic partial plans,
    wherein said hybrid planning engine converts the one or more deterministic partial plans into one or more hybrid partial plans and splices the one or more hybrid partial plans into selected null hybrid contingency plans to generate one or more hybrid contingency plans for each agent in each of the one or more possible worlds,
    wherein said hybrid planning engine splices the one or more hybrid partial plans into selected hybrid contingency plans for each agent in each of the one or more possible worlds to generate a plurality of hybrid contingency plans, the selected hybrid contingency plans include at least a hybrid contingency plan for one more uncontrolled agents in the one or more possible worlds and a hybrid contingency plan for one or more controlled agents in the one or more possible worlds, and the hybrid planning engine generates a deterministic planning problem for each of the one or more conflicts.

2. The system of claim 1 in which the hybrid planning engine compares selected hybrid contingency plans from the plurality of hybrid contingency plans to determine one or more conflicts therein.

3. The system of claim 1 in which each said deterministic problem includes possible effect actions having multiple effects which are converted into one or more deterministic actions each having a single effect.

4. The system of claim 3 in which the hybrid planning engine evaluates the deterministic actions converted from possible effect actions and incorporates only those deterministic actions into each said deterministic planning problem that satisfy a predetermined constraint.

5. The system of claim 4 in which the deterministic planning engine generates one or more deterministic partial plans from each said deterministic problem.

6. The system of claim 5 in which the hybrid planning engine converts said one or more deterministic partial plans into the hybrid partial plan.

7. The system of claim 6 in which the hybrid planning engine splices that
    hybrid partial plan into one of the selected hybrid contingency plans to resolve said one or more conflicts.

8. The system of claim 1 in which the hybrid contingency plan includes possible effect actions and/or deterministic actions.

9. The system of claim 2 in which the selected hybrid contingency plans are selected by a user and/or by the hybrid planning engine.

10. A hybrid probabilistic/deterministic planning system comprising:
    a computer processor;
    a hybrid planning engine to run on the computer processor responsive to a null hybrid contingency plan including user defined probabilistic problem including goals, possible effect actions, and the initial state of one or more possible worlds configured to extract a deterministic planning problem therefrom; and
    a deterministic planning engine responsive to the hybrid planning engine configured to generate one or more deterministic partial plans,
    wherein said hybrid planning engine converts the one or more deterministic partial plans into one or more hybrid partial plans and splices the one or more hybrid partial plans into selected null hybrid contingency plans to generate one or more hybrid contingency plans for each agent in each of the one or more possible worlds,
    wherein the hybrid planning engine is configured to perform simultaneous reachability analysis across the one or more possible worlds in a single pass to ground the possible effects actions into grounded deterministic actions.

11. The system of claim 1 further including a processor and a memory.

12. A hybrid probabilistic/deterministic planning system comprising:
    a computer processor;
    a hybrid planning engine to run on the computer processor configured to compare selected hybrid contingency plans to determine one or more conflicts therein and extract one or more deterministic planning problems there from to resolve the one or more conflicts;
    a deterministic planning engine responsive to the hybrid planning engine configured to generate one or more deterministic partial plans; and
    wherein said hybrid planning engine converts the one or more deterministic partial plans into a hybrid partial plan and then splices that hybrid partial plan into one of the selected hybrid contingency plans to resolve said one or more conflicts.

13. The system of claim 12 in which the selected hybrid contingency plans include at least a hybrid contingency plan for one more uncontrolled agents in one or more possible worlds and a hybrid contingency plan for one or more controlled agents in one or more possible worlds.

14. The system of claim 13 in which the hybrid planning engine generates a deterministic planning problem for each of the one or more conflicts.

15. The system of claim 14 in which each said deterministic problem includes the possible effect actions having multiple effects which are converted into one or more deterministic actions each having a single effect.

16. The system of claim 15 in which the hybrid planning engine evaluates the deterministic actions converted from possible effect actions and incorporates only those deterministic actions into each said deterministic planning problem that satisfy a predetermined constraint.

17. The system of claim 16 in which the deterministic planning engine generates one or more deterministic partial plans from each said deterministic problem.

18. The system of claim 17 in which the hybrid planning engine converts said one or more deterministic partial plans into the hybrid partial plan.

19. The system of claim 18 in which the hybrid planning engine splices that hybrid partial plan into one of the selected hybrid contingency plans to resolve said one or more conflicts.

20. The system of claim 12 in which the hybrid contingency plan includes possible effect actions and/or deterministic actions.

21. The system of claim 12 in which the selected hybrid contingency plans are selected by a user and/or by the hybrid planning engine.

22. The system of claim 12 in which the hybrid planning engine is configured to perform simultaneous reachability analysis across the one or more possible worlds in a single pass to ground the possible effects actions into grounded deterministic actions.

23. The system of claim 12 further including a processor and a memory.

24. A hybrid probabilistic/deterministic planning method comprising:
    generating one or more null hybrid contingency plans including a user defined probabilistic problem including goals, possible effect actions, and the initial state of one or more possible worlds;
    extracting one or more deterministic planning problems from the one or more null hybrid contingency plans;
    generating one or more deterministic partial plans from the one or more deterministic planning problems;
    converting the one or more deterministic partial plans into one or more hybrid partial plans;
    splicing the one or more hybrid partial plans into selected null hybrid contingency plans to generate one or more hybrid contingency plans for each agent in each of the one or more possible worlds;
    splicing the one or more hybrid partial plans into selected hybrid contingency plans for each agent in each of the one or more possible worlds to generate a plurality of hybrid contingency plans,
    wherein the selected hybrid contingency plans include at least a hybrid contingency plan for one more uncontrolled agents in the one or more possible worlds and a hybrid contingency plan for one or more controlled agents in the one or more possible worlds; and
    generating a deterministic planning problem for each of the one or more conflicts.

25. The method of claim 24 further including the step of comparing selected hybrid contingency plans from the plurality of hybrid contingency plans to determine one or more conflicts therein.

26. The method of claim 24 in which each said deterministic problem includes possible effect actions having multiple effects which are converted into one or more deterministic actions each having a single effect.

27. The method of claim 26 further including the step of evaluating the deterministic actions converted from possible effect actions and incorporates only those deterministic actions into each said deterministic planning problem that satisfy a predetermined constraint.

28. The method of claim 27 further including the step of generating one or more deterministic partial plans from each said deterministic problem.

29. The method of claim 28 further including the step of converting said one or more deterministic partial plans into the hybrid partial plan.

30. The method of claim 29 further including the step of splicing that hybrid partial plan into one of the selected hybrid contingency plans to resolve said one or more conflicts.

31. The method of claim 24 in which the selected hybrid contingency plans are selected by a user and/or a hybrid planning engine.

32. A hybrid probabilistic/deterministic planning method comprising:
    generating one or more null hybrid contingency plans including a user defined probabilistic problem including goals, possible effect actions, and the initial state of one or more possible worlds;
    extracting one or more deterministic planning problems from the one or more null hybrid contingency plans;
    generating one or more deterministic partial plans from the one or more deterministic planning problems;
    converting the one or more deterministic partial plans into one or more hybrid partial plans;
    splicing the one or more hybrid partial plans into selected null hybrid contingency plans to generate one or more hybrid contingency plans for each agent in each of the one or more possible worlds; and
    performing simultaneous reachability analysis across the one or more possible worlds in a single pass to ground the possible effects actions into grounded deterministic actions.

33. A hybrid probabilistic/deterministic planning method comprising:
    selecting at least two hybrid contingency plans;
    comparing the selected hybrid contingency plans to determine one or more conflicts therein; extracting a deterministic planning problem from the selected hybrid contingency plans to resolve the one or more conflicts;
    generating one or more deterministic partial plans from the deterministic planning problem;
    converting the one or more deterministic partial plans into a hybrid partial plan; and
    splicing the hybrid partial plan into one of the hybrid contingency plans to resolve said one or more conflicts.

34. The method of claim 33 in which the selected hybrid contingency plans include at least a hybrid contingency plan for one more uncontrolled agents in one or more possible worlds and a hybrid contingency plan for one or more controlled agents in one or more possible worlds.

35. The method of claim 34 further including the step of generating a deterministic planning problem for each of the one or more conflicts.

36. The method of claim 35 in which each said deterministic problem includes the possible effect actions having multiple effects which are converted into one or more deterministic actions each having a single effect.

37. The method of claim 36 further including the step of evaluating the deterministic actions converted from possible effect actions and incorporates only those deterministic actions into each said deterministic planning problem that satisfy a predetermined constraint.

38. The method of claim 37 further including the step of generating one or more deterministic partial plans from each said deterministic problem.

39. The method of claim 38 further including the step of converting said one or more deterministic partial plans into the hybrid partial plan.

40. The method of claim 39 further including the step of splicing that hybrid partial plan into one of the selected hybrid contingency plans to resolve said one or more conflicts.

41. The method of claim 33 in which the selected hybrid contingency plans are selected by a user and/or a hybrid planning engine.

42. The method of claim 33 further including the step of performing simultaneous reachability analysis across the one or more possible worlds in a single pass to ground the possible effects actions.

* * * * *